No. 706,544. Patented Aug. 12, 1902.
R. FLEMING.
SYSTEM OF ELECTRICAL DISTRIBUTION.
(Application filed Jan. 26, 1900.)
(No Model.)

Witnesses.
Edward Williams Jr
Benjamin B. Hull

Inventor:
Richard Fleming.
by Albert G. Davis
Atty.

UNITED STATES PATENT OFFICE.

RICHARD FLEMING, OF LYNN, MASSACHUSETTS, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 706,544, dated August 12, 1902.

Application filed January 26, 1900. Serial No. 2,830. (No model.)

*To all whom it may concern:*

Be it known that I, RICHARD FLEMING, a subject of the Queen of Great Britain, residing at Lynn, county of Essex, State of Massachusetts, have invented certain new and useful Improvements in Systems of Electrical Distribution, (Case No. 1,434,) of which the following is a specification.

My invention relates to certain improvements in series systems of electrical distribution, and, furthermore, comprises a novel form of arc-lamp particularly adapted for use in connection with such systems.

The novel features which characterize my invention I have particularly pointed out in the claims appended hereto, while its specific nature and mode of operation I have set forth in the following description and the accompanying drawings, in which—

Figure 1:
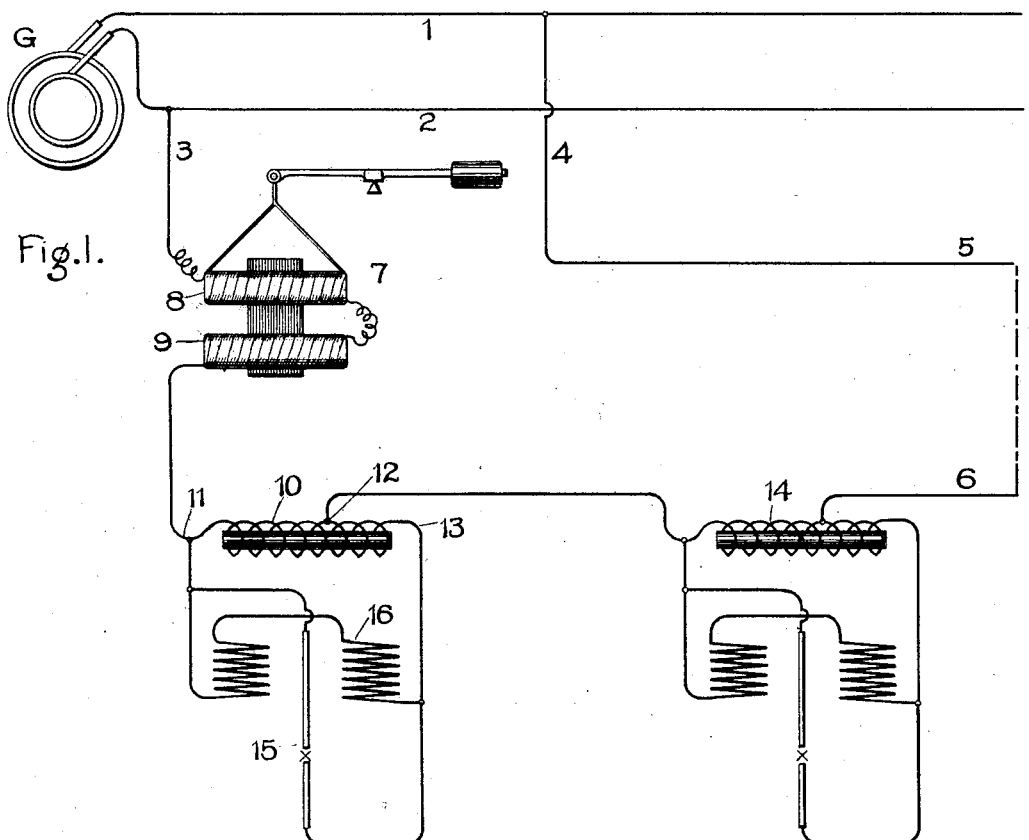
Figure 2:
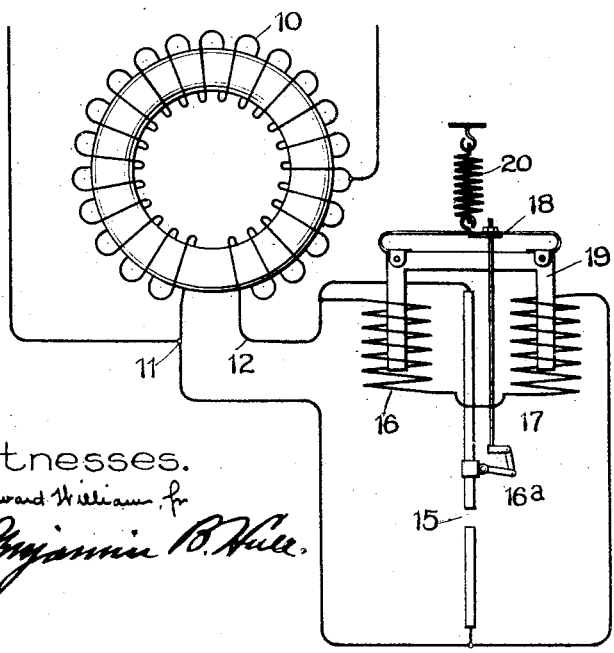

Figure 1 represents a distributing system embodying my invention, while Fig. 2 is a view in detail of a certain portion of the same.

The maximum number of translating devices which could be supplied from a single-series circuit has heretofore been limited to a number depending upon the maximum difference of potential of the source of current from which the energy of the circuit is derived. My present invention permits an increase in the number of translating devices which may be fed from a given series circuit, this result being secured by inserting a plurality of step-up transforming devices in the circuit and feeding a translating device from each of these transforming devices. I ordinarily employ arc-lamps as translating devices, and these lamps are fed from the step-up transforming devices instead of being connected in series with each other, as has heretofore been the case. This arrangement is particularly valuable in cases where it is desired to extend a series arc-lighting circuit into districts far removed from the generating-station. Such circuits as ordinarily installed are connected with arc-lamps one after another until the maximum capacity of the circuit is reached. If it is then desired to supply an additional number of lamps at points farther removed from the station, it is necessary to run an additional circuit, thus involving considerable inconvenience and expense. By the use of the present invention the capacity of the series circuit is increased, so that in a case such as mentioned the circuit may be extended to include additional lamps, thus avoiding the necessity of running an additional circuit.

An arrangement of apparatus embodying this invention is indicated diagrammatically in Fig. 1. At G is shown a source of current preferably of high electromotive force. Mains 1 2 extend therefrom and supply power to circuits or translating devices of any character. Leads 3 4 are connected to the supply-mains and conduct current therefrom to a series circuit 5 6, in which a constant current or approximately constant current is maintained. The regulation of current may be secured in any suitable manner—as, for instance, if the current is alternating by the employment of a constant-current reactive coil, (indicated diagrammatically at 7.) A reactive coil of this character consists of relatively movable windings 8 and 9, mounted so as to be urged together by mechanical force and urged apart by the repulsive action of current flowing in the coils. Devices of this character are well known in the art, and for the present purpose no further description thereof is necessary. The series circuit 5 6 supplies energy to translating devices, preferably arc-lamps, through the operation of step-up transforming devices included in the circuit. The transforming device which I prefer to employ for the present purpose consists of a compensator producing a higher electromotive force at its secondary terminals than the electromotive force impressed upon its primary terminals. To secure this result, the points of connection of the series circuit to each compensator are made such as to include less than the whole length of the compensator-coil, while the connections of the translating device supplied from each compensator are made such as to include more of the compensator-coil than that between the connections of the supply-circuit to the compensator-coil. This arrangement is shown clearly in Fig. 1, in which 10 indicates the coil of a compensator, 11 and 12 the connections of the series-supply circuit thereto, and 11 and 13 the connections for the translating device to the compensator. The series circuit is intended to include a large number of such compensators, but owing to the inconvenience of representing the actual conditions in the drawings only two of such compensators, 10 and 14, have been shown by way of illustration. A special type of arc-lamp is used in this connection, and consists, as will be seen from the diagram in Fig. 1, of separable carbons or electrodes 15 and a controlling-magnet 16. The controlling-magnet 16 has its windings in shunt to the arc and connected across the terminals of the compensator.

Fig. 2 shows the arrangement somewhat more in detail. The compensator is indicated at 10 and is connected in the same manner as in Fig. 1, so as to produce a higher secondary electromotive force than that impressed upon its primary terminals. The controlling-magnet 16 has its windings connected directly across the secondary terminals 11 and 12 and is therefore directly responsive to changes in electromotive force at these terminals. The electrodes 15 are similarly connected to terminals 11 and 12. Suitable clutch mechanism 16ª operates upon the upper electrode or carbon and is connected by means of a rod 17 to a spring 18, carried by the core 19 of the shunt-actuating magnet 16. The spring 18 in its turn is connected by a coil-spring 20 to some fixed part of the lamp structure. The spring 20 serves to separate the electrodes of the lamp when no current is supplied to the lamp. As soon, however, as current passes through the compensator, thereby setting up an electromotive force between the terminals 11 and 12 of the lamp, current passes through the winding of the shunt-magnet 16, thereby acting upon the core 19, which is thus drawn downward until the electrodes of the lamp touch. The resulting partial short-circuit immediately reduces the electromotive force impressed upon the lamp, and consequently the current flowing in the coils of the regulating-magnet. The spring 20 then acts to withdraw the core 19 and so causes the electrodes of the lamp to separate. The partial short-circuit being thus removed the electromotive force at the terminals of the lamp increases, thereby again increasing the current through the coils of the regulating-magnet. A slight oscillation takes place between the relatively movable parts mentioned until they finally come to rest in a position such as to maintain an arc between the electrodes of the lamp. The length of this arc may be determined by a suitable relation between the strength of the magnet 16 and the spring 20.

What I claim as new, and desire to secure by Letters Patent of the United States, is—

1. The combination of an alternating-current circuit, means for maintaining a substantially constant current in said circuit, a plurality of compensators in series in said circuit, the points of connection of said circuit to each compensator being such as to include less than the whole length of the compensator-coil, and a translating device supplied from each compensator and connected thereto so as to include the whole length of the compensator-coil.

2. The combination of an alternating-current circuit, means for maintaining a substantially constant current in said circuit, a plurality of compensators in series in said circuit, the points of connection of said circuit to each compensator being such as to include less than the whole length of the compensator-coil, and a translating device supplied from each compensator and connected thereto so as to include more of the compensator-coil than that between the connections of said circuit.

In witness whereof I have hereunto set my hand this 22d day of January, 1900.

RICHARD FLEMING.

Witnesses:
DUGALD McKILLOP,
HENRY O. WESTENDARP.